United States Patent [19]

Godeau

[11] Patent Number: 5,505,495
[45] Date of Patent: Apr. 9, 1996

[54] WATERTIGHT COUPLING BETWEEN A TUBE AND AN ENDPIECE

[75] Inventor: Denis Godeau, Les Grands Pres, France

[73] Assignee: Hutchinson, Paris, France

[21] Appl. No.: 170,014

[22] Filed: Dec. 20, 1993

[30] Foreign Application Priority Data

Jan. 7, 1993 [FR] France .................................. 93 00079

[51] Int. Cl.[6] .................................................. F16L 35/00
[52] U.S. Cl. ........................... 285/3; 285/137.1; 285/292; 285/331; 285/908; 285/910
[58] Field of Search ................................ 285/137.1, 284, 285/292, 331, 369, 910, 908, 3

[56] References Cited

U.S. PATENT DOCUMENTS

| | | | |
|---|---|---|---|
| 3,890,584 | 6/1975 | Spinner et al. | 285/910 X |
| 4,011,652 | 3/1977 | Black | 285/292 X |
| 4,173,362 | 11/1979 | Glover et al. | 285/423 X |
| 4,650,220 | 3/1987 | Grabowski | 285/284 X |
| 4,846,506 | 7/1989 | Bocson et al. | 285/4 |

FOREIGN PATENT DOCUMENTS

| | | |
|---|---|---|
| 470274 | 12/1950 | Canada ................................... 285/331 |
| 233608 | 8/1987 | European Pat. Off. . |
| 1272178 | 8/1961 | France . |
| 2178487 | 10/1973 | France . |
| 2184983 | 12/1973 | France . |
| 2214078 | 8/1974 | France . |

Primary Examiner—Dave W. Arola
Attorney, Agent, or Firm—Bell, Seltzer, Park & Gibson

[57] ABSTRACT

A waterproof coupling between at least one tube and at least one endpiece by means of a molded portion secured to the tube and providing means that provide sealing between the tube and the endpieces, wherein said portion which is made of a material of the elastomer type or of a material having analogous properties, and that has been vulcanized or cross-linked after molding, is also secured, after vulcanization or cross-linking, to a ring or sleeve by means of which the tube is suitable for being assembled to the endpiece.

5 Claims, 5 Drawing Sheets

WATERTIGHT COUPLING BETWEEN A TUBE AND AN ENDPIECE

The invention relates to a watertight coupling between a tube and an endpiece, and to a method of manufacturing it.

FIELD OF THE INVENTION

The invention relates in particular to couplings and similar devices for use in the engine compartments of motor vehicles, although the invention is not limited in any way thereto. In such applications, e.g. for setting up the cooling circuit of a vehicle engine, a tube in which cooling fluid flows needs to be assembled in sealed manner to inlet and outlet endpieces of a heat exchanger or a heater of the vehicle. Once assembled, such an assembly should firstly retain its properties over time, secondly it must be easy to implement and thirdly, in order to satisfy the requirements of vehicle manufacturers, it must be as cheap as possible and it must be capable of being used on assembly lines that are very highly automated.

BACKGROUND OF THE INVENTION

In order to satisfy the last-mentioned condition, the Applicant has already proposed devices in which translation motion of the two portions of a coupling towards each other serves to assemble a tube with an endpiece, sealing being obtained by means of a gasket that is associated with one of said portions, see FR-A-2 632 707 and FR-A-2 656 404, for example. Although such devices give satisfaction, they are nevertheless sometimes considered as being too expensive for fitting to the engines of all the vehicles with which they could be associated, and this is because of the presence of a gasket of a structure that is relatively complex and to the presence of means distinct from the gasket for coupling together the two portions of the coupling. In FR-2 636 713, proposals have also been made for a junction device between a flexible hose and a rigid endpiece in which a coupling piece made of plastic and secured to the flexible tube has fastening means for engaging the rigid endpiece, and two sealing lips for cooperating with said endpiece, which endpiece must then necessarily both be relatively complex in shape and be made with dimensional characteristics that are very accurate, thereby increasing cost.

OBJECTS AND SUMMARY OF THE INVENTION

Consequently, a general object of the invention is to provide a watertight coupling between a tube and an endpiece that does not present the limitations of known devices.

In this respect, an object of the invention is to provide a watertight coupling between a tube and an endpiece which is of excellent quality, of long lifetime, and that is cheaper than known devices.

Another object of the invention is to provide a method of manufacturing such a coupling suitable for enabling component parts to be used such as tubes or endpieces in which dimensions can vary in compliance with the usual manufacturing tolerances for such components.

Another object of the invention is to provide such a method which, regardless of the component parts used for implementing it, gives rise to couplings that can subsequently be assembled in installations that are automated or robotized.

According to the invention, a waterproof coupling between at least one tube and at least one endpiece via a molded portion secured to the tube and providing means that provide sealing between the tube and the endpieces, wherein said portion which is made of a material of the elastomer type or of a material having analogous properties, and that has been vulcanized or cross-linked after molding, is also secured, after vulcanization or cross-linking, to a ring or sleeve by means of which the tube is suitable for being assembled to the endpiece.

An appropriate choice of the materials of the elastomer type or having similar properties and constituting simultaneously the sealing means between the tube and the endpiece and the coupling means between the tube and the ring or sleeve, and also, where appropriate, the presence of a bonding agent, makes it possible to apply the invention to couplings in which both the tube and the ring or sleeve are made of metal, a polymer plastics material, or an elastomer material.

The means that provide sealing are shaped as a function of practical requirements, and, by way of example, they may be of the type comprising a sealing ring, or a gasket having lips, or the like.

An advantageous application of the invention lies in devices for assembling together two or more tubes and endpieces, and for devices that are required to perform an additional function, such as that of keeping two fluid circuits separate by means of a membrane until the membrane is perforated while the parts of the coupling are being put together.

The invention also provides a method of manufacturing a coupling as defined above, wherein to make the means providing sealing between at least one tube and at least one endpiece and also providing coupling between the ring or sleeve and the tube, a material of the elastomer type or having analogous properties is molded around said tube and at least one removable core co-operating therewith, which material is subsequently vulcanized or cross-linked.

In an implementation of the method, molding between the tube and the ring or sleeve is performed, preferably by injection molding, in a mold that encloses both of them.

In another implementation, a first material for forming the sealing and coupling means between the tube and the ring is initially injected into a first mold and around the tube and at least one removable core, said first material is then subjected to pre-vulcanization, the resulting assembly is placed in a second mold, a second material for forming the ring is then injected therein, the ring thus being molded over the coupling and sealing means, and the entire assembly is vulcanized or cross-linked.

The first and second materials may both be identical and preferably both of the elastomer type, injection of said material then being performed in a single mold and being followed by a single stage of vulcanization or of cross-linking.

In a variant, the first material may be of the elastomer type while the second material is of the plastomer type.

In which case, and when the first and second materials are additionally mutually compatible, the invention also envisages making use of a single mold only in which both materials are introduced by bi-injection.

Also in that case, the invention provides for taking advantage of the shrinkage or expansion or compression properties of the second material for the purpose of fixing the ring or sleeve onto said means for sealing and coupling the tube to the ring or sleeve.

In yet another implementation, the ring or sleeve is fixed onto said means for sealing and coupling the tube to the ring or sleeve by adhesive, said means being made during a step preceding the application of adhesive.

Whatever the way in which the method is implemented, the material of the elastomer type or having analogous properties may be molded in such a manner as to make an auxiliary member such as a tube-closing membrane simultaneously with making the means that provide sealing between the tube and the endpiece and that provide the coupling between the tube and the ring or sleeve.

In which case, a plurality of removable cores are associated with the mold, and the use of a plurality of cores is also advantageous when making certain shapes of sealing means.

BRIEF DESCRIPTION OF THE DRAWINGS

The invention will be well understood from the following description that is given by way of example and made with reference to the accompanying drawings, in which.

MORE DETAILED DESCRIPTION

With reference initially to FIGS. 1 to 6 which show various couplings of the invention, in particular watertight couplings suitable for use in the engine compartment of a motor vehicle, e.g. for connecting the tubes that convey the cooling fluid of the vehicle engine together with inlet and outlet endpieces of a heat exchanger or of a heater of said vehicle.

Figure 1:
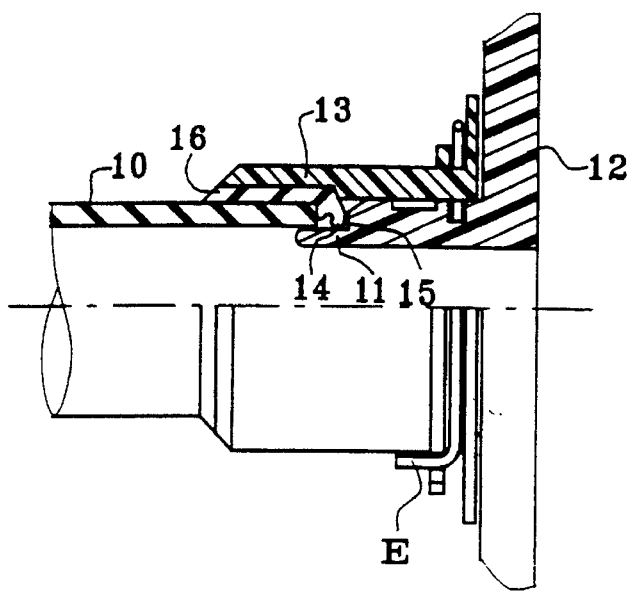
FIG. 1 is a view, partially in elevation and partially in longitudinal section, showing a coupling of the invention.

In the device shown in FIG. 1, the tube 10 is made of metal, of polymer plastics material, or of an elastomer type material (optionally reinforced) and it is designed to be assembled together with an endpiece 11 that is secured to a plate 12, assembling being provided by means of a ring 13. The endpiece 11 is made of the same material as the tube 10, or of a different material, the ring is assembled to the endpiece by means of a clip E, e.g. as described in FR-2 691 512 in the name of the Applicant. Nevertheless, the invention is not limited in any way to this particular way of assembling the ring to the endpiece, which assembly could be performed by means of a collar, a different type of spring clip, etc. . . .

In accordance with the invention, axial sealing between the tube 10 and the endpiece 11 is obtained by a sealing lip 14 which co-operates with a shoulder 15 of the endpiece, and which is integrally formed with an annular portion 16 constituting the means for coupling the tube 10 and the ring 13, the material from which the portion 16 is made advantageously being of the elastomer type or being a material having analogous properties, and being shaped by molding, preferably injection molding, and then vulcanized or cross-linked.

Figure 2:
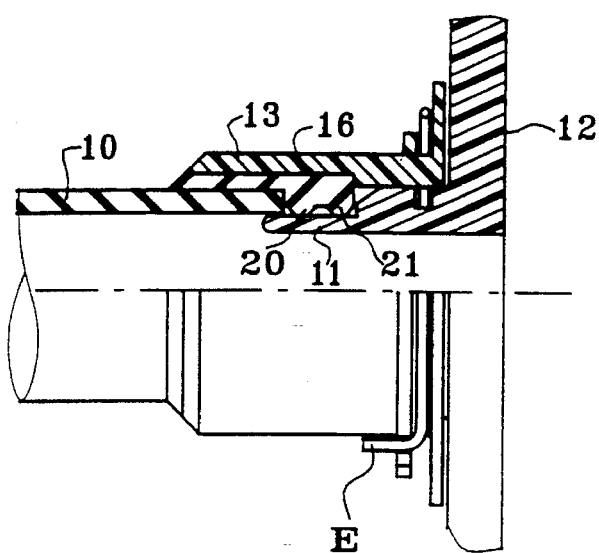
FIG. 2 is a view analogous to FIG. 1, but for another embodiment.

In the embodiment of FIG. 2, in which items analogous to those of the preceding embodiment are given the same references, radial sealing between the tube 10 and the endpiece 11 is the result of compressing swellings 20 and 21 integrally formed with the portion 16 that is interposed between the tube 10 and the ring 13.

Figure 3:
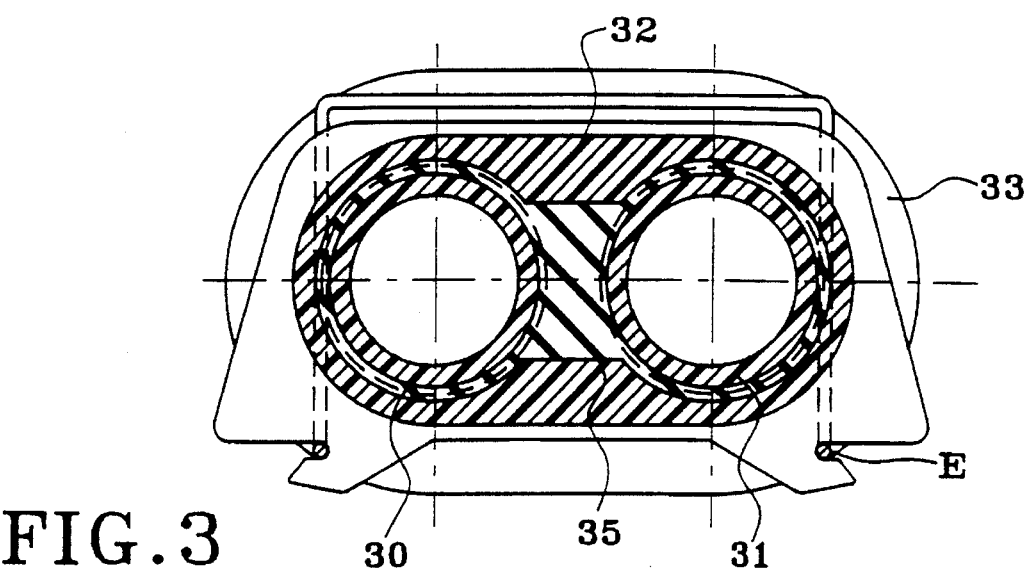
FIG. 3 is a cross-section through yet another coupling of the invention.

In the embodiment of FIG. 3, two tubes 30 and 31 are designed to be coupled in sealed manner to two substantially parallel endpieces (not shown), assembly taking place by means of a ring 32 that is united with a base 33 carrying the endpieces by means of a clip E. In accordance with the invention, the tubes 30 and 31 are coupled to the ring 32 by means 35 that also serve simultaneously to provide sealing between the tubes and the endpieces, and which are shaped by molding, preferably injection molding, using a material of the elastomer type or having analogous properties, which material is subsequently vulcanized or cross-linked.

Whatever the embodiment, the natural qualities of the elastomer material used make it possible firstly to obtain excellent sealing, even when the component elements of the coupling are free to move angularly relative to one another, and secondly to guarantee satisfactory assembly over a relatively large range of radial tolerances, both for the tubes and for the endpieces. In addition, the absence of an independent sealing gasket, as is required in known couplings, makes it possible to facilitate assembly of the coupling, to reduce the cost thereof, and to exert assembly forces that need only be small, in particular in the device having axial sealing as shown in FIG. 1.

Figure 4:
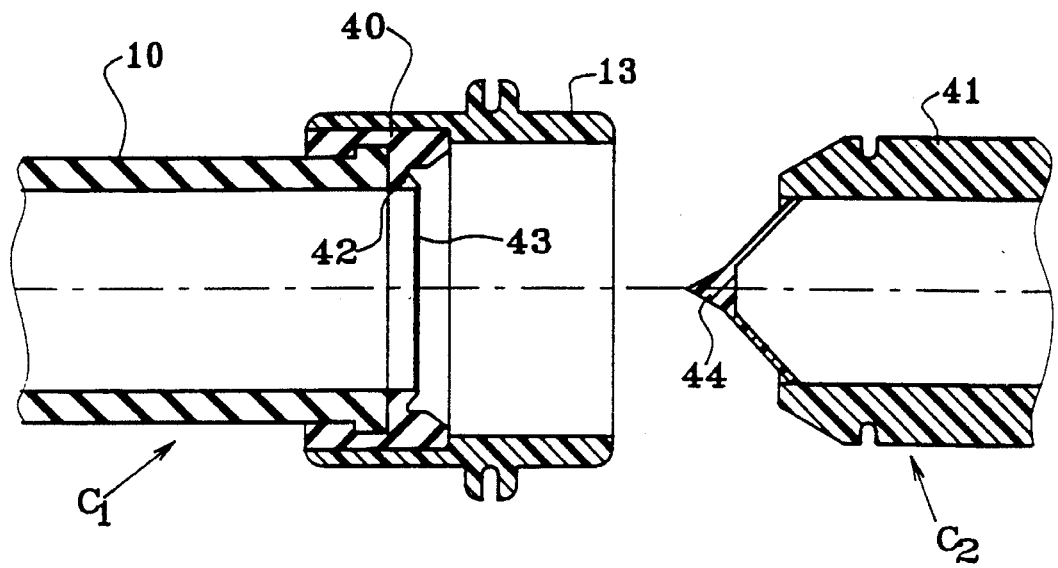
FIG. 4 is a view analogous to FIGS. 1 and 2, but for yet another embodiment.

In the embodiment shown in FIG. 4, the tube 10 and the ring 13 are associated with means 40 that serve firstly to provide coupling between the ring and the tube and secondly to provide sealing between the tube 10 and an endpiece 40 by means of a lip 42, and in addition they keep the fluid circuit $C_1$ associated with the tube separate from the circuit $C_2$ associated with the endpiece by means of a membrane 43 that is integral with the means 40 and that closes the tube 10 until it is pierced by a perforator 44 provided on the endpiece 41.

Figure 5:
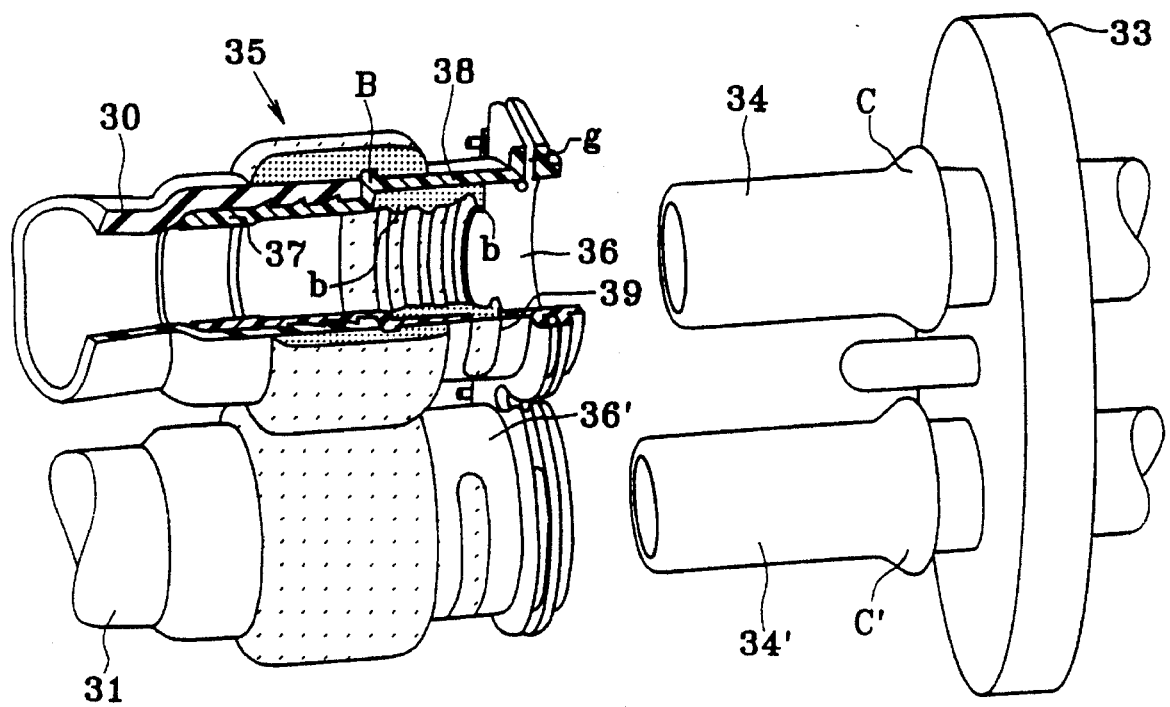
FIGS. 5 and 6 are diagrammatic perspective views of yet another coupling of the invention, respectively before and after being assembled together.
Figure 6:
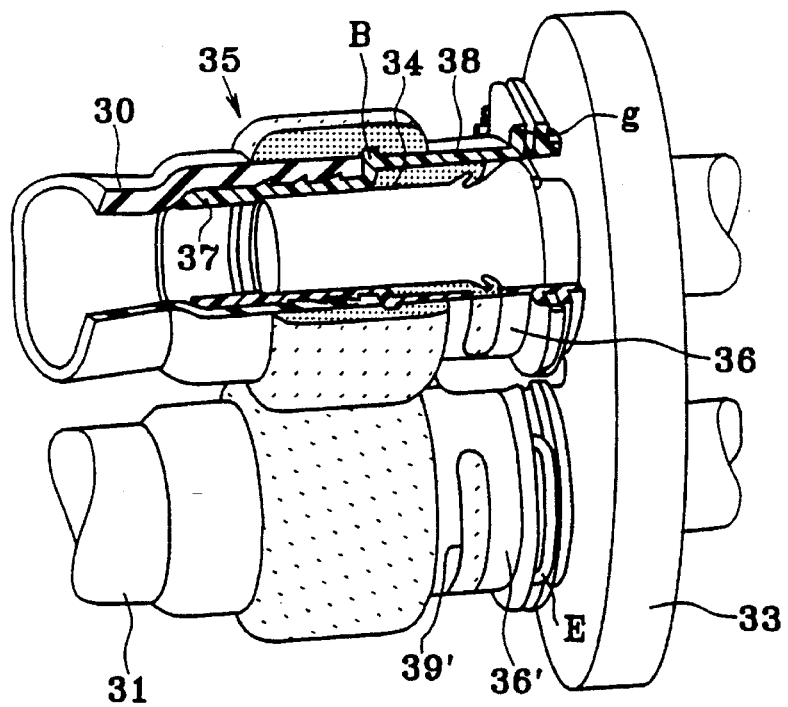

In the embodiment shown in FIGS. 5 and 6, in which items analogous to those of the embodiment of FIG. 3 are given the same references, a plate or base 33 carries substantially parallel endpieces 34 and 34' for coupling in sealed manner to respective tubes 30 and 31. The coupling takes place via sleeves 36 and 36' suitable for being assembled to the endpieces 34 and 34' by means of a clip E received in a groove g in the sleeves and which, in the assembled condition as shown in FIG. 6, is locked in place by collars c and c' on the endpieces 34 and 34'. In accordance with the invention, the tubes 30 and 31 are coupled to the sleeves 36 and 36' by means 35 which also serves simultaneously to provide sealing between the tubes and the endpieces and which are shaped by molding, preferably injection molding, using a material of the elastomer type or having analogous properties, which material is subsequently vulcanized or cross-linked. As can clearly be seen in FIGS. 5 and 6, each of the sleeves 36 and 36' includes a portion such as 37 on which a cylindrical portion 38 is fitted until it comes into contact with an end abutment B of the tube 30, which cylindrical portion lies substantially in line with the end portion of the tube 30 fitted onto the portion 37, and there can also be seen peripheral openings such as 39 which are filled with the material constituting the means 35, which means extend both outside the tubes 30 and 31 and the sleeves 36 and 36', and inside said sleeves where they provide radial sealing members such as swellings b obtained during molding of said material.

Watertight couplings that satisfy the rigorous criteria imposed by motor vehicle manufacturers have been obtained using tubes 10 or 30, 31 and endpieces 11, 34, 34', and 41 made of metal, made of elastomer type material, optionally reinforced, such as EPDM rubber or silicone rubber, or else made of a polymer plastics material such as polyamide, etc. ..., the ring 13 or the sleeves 36, 36' being made of metal, e.g. aluminum or stainless steel, or of an elastomer type material such as EPDM rubber, or a plastics material of the plastomer type such as polyamide, the means providing sealing between the tube(s) and the endpiece(s) while simultaneously coupling the ring or the sleeve to the tube(s) being preferably selected from materials of the elastomer type such as EPDM or silicone rubbers, together with an interposed bonding agent, where appropriate, such as the agent known under the name Chemosil.

To manufacture a watertight coupling of the type shown in FIGS. 1 to 6, the invention proposes making means that provide sealing between the tube(s) and the endpiece(s) and which may be of any suitable type, while simultaneously providing coupling between the ring or sleeve and the tube by molding said means around the tube and at least one removable core that co-operates therewith out of a material of the elastomer type or having analogous properties, which material is subsequently vulcanized or cross-linked.

In a first implementation (FIG. 7) a tube 10 whose outside surface has been cleaned and brushed is fitted onto a removable core N, while the ring 13 is fitted in the vicinity of its end provided for surrounding the tube 10 with a bonding agent such as Chemosil. After the ring 13 and the assembly comprising the tube 10 and the core N have been placed inside a two-part mold M comprising parts $M_1$ and $M_2$, a material of the elastomer type or having analogous properties is injected into the mold as shown by arrow I, said material being intended to form the means 16 for couping the ring to the tube and the sealing means 14 (in this case a lip type gasket) between the tube and an endpiece, this injection stage being followed by a stage during which the injected material is vulcanized or cross-linked, after which the mold is opened and the removable core N is extracted from the assembly made in this way.

Figure 7:
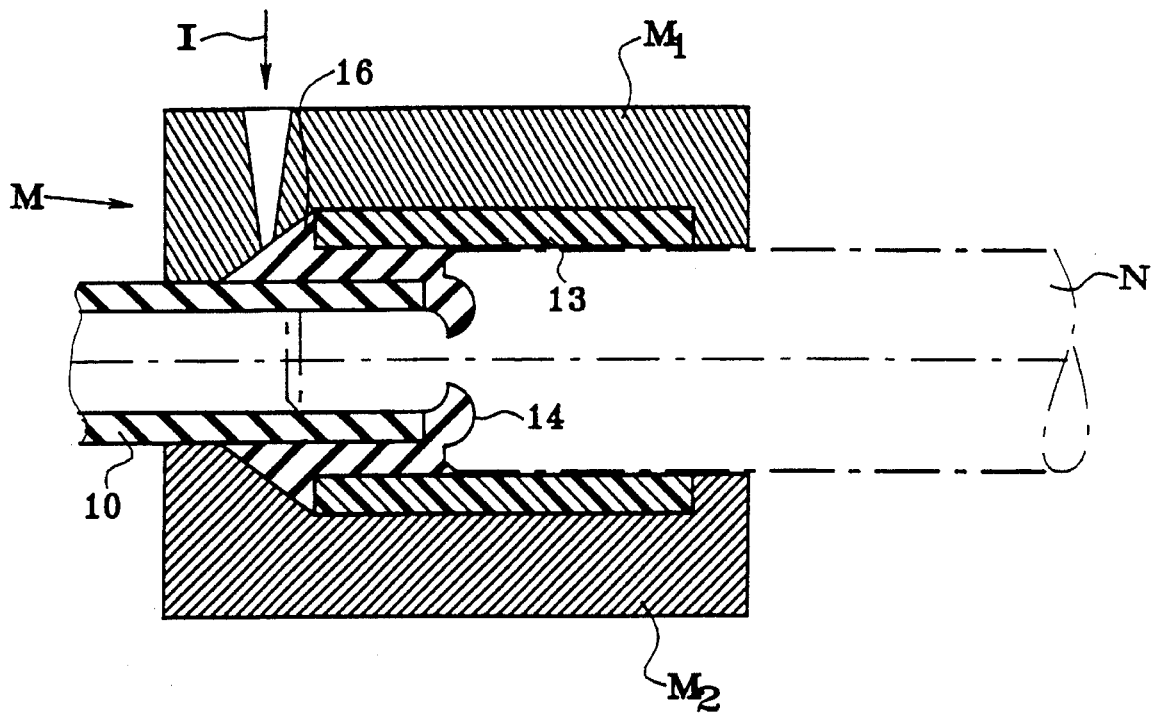
FIG. 7 shows a method of manufacture in accordance with the invention.
Figure 8:
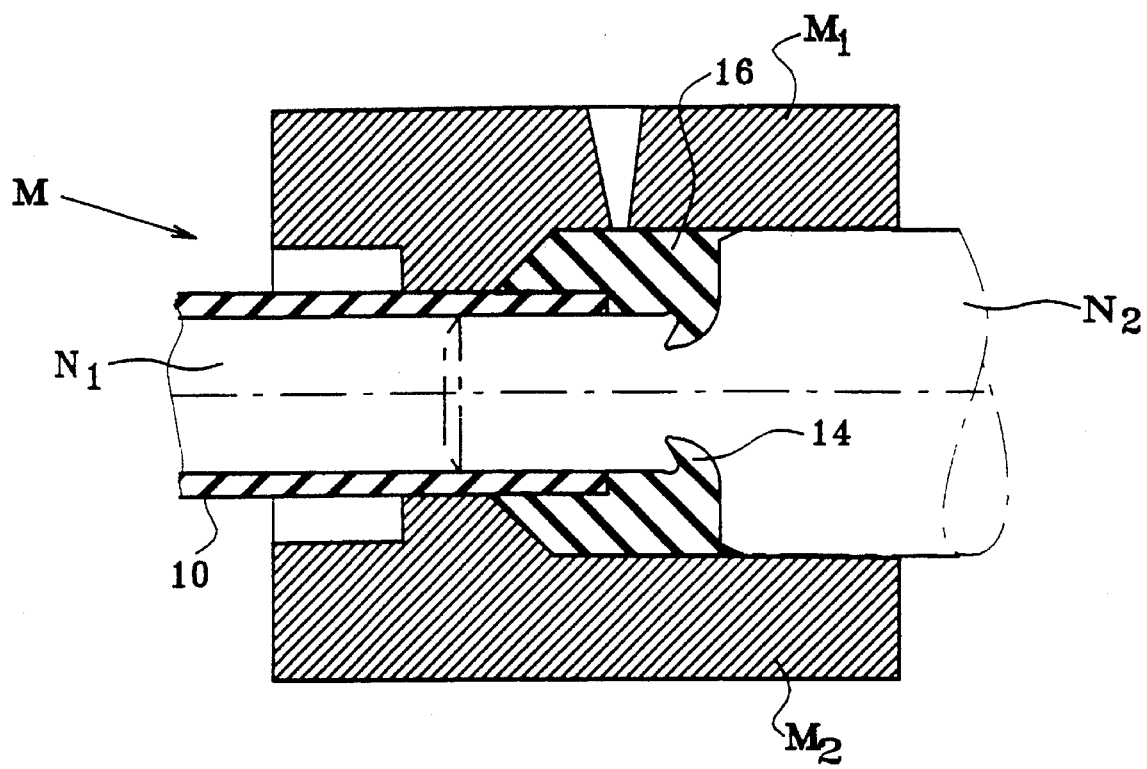
FIGS. 8 and 9 show another implementation of the method of the invention.
Figure 9:
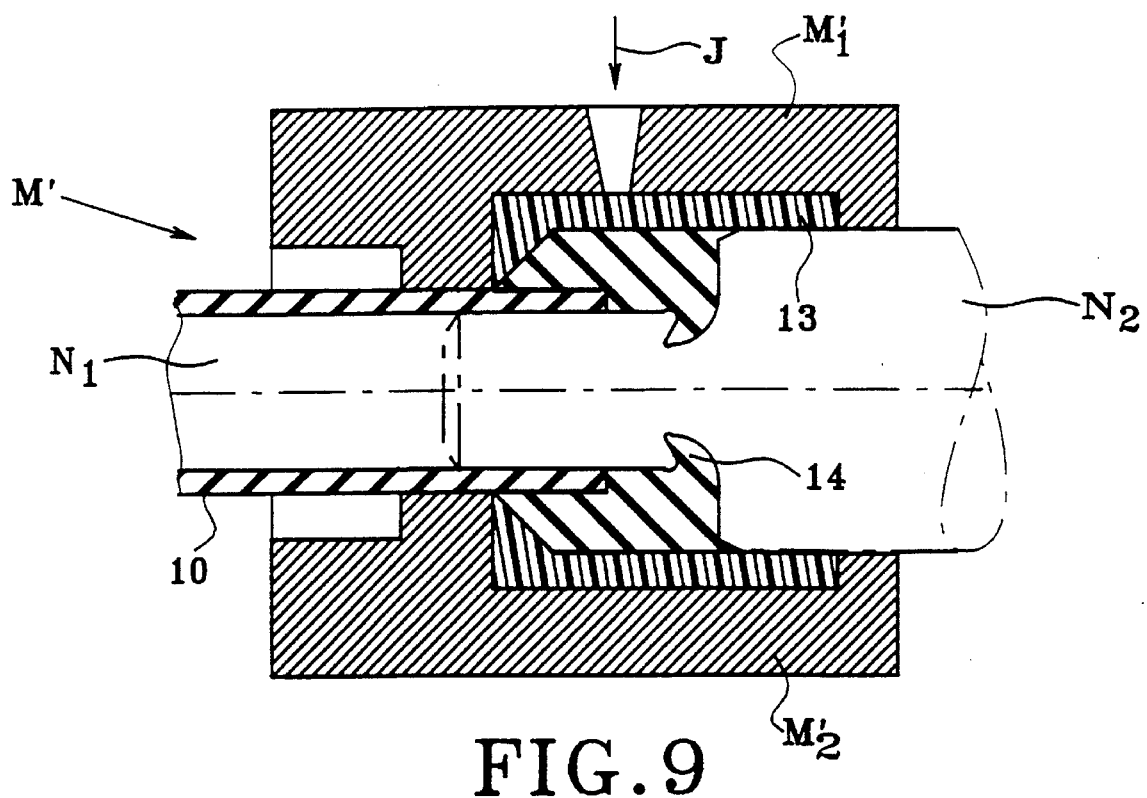

In the implementation shown in FIGS. 8 and 9, where portions analogous to those of FIG. 7 are given the same references, the means 16 and the sealing means 14 are initially formed on the tube 10 during a first stage by injecting a material of the elastomer type or having analogous properties into the mold M in which the tube fitted onto its removable core N has been placed, and the injected material is then pre-vulcanized. The assembly obtained in this way is then placed in a second mold M' (comprising two parts $M'_1$ and $M'_2$) into which a material designed to form the ring 13 is injected as shown by arrow J, injection being followed by a stage of vulcanization or of cross-linking as a function of the nature of the materials implemented.

In a first variant implementation of the method, the outside surface of the means 16 are coated with a bonding agent prior to proceeding with the molding of the second material.

In another variant of the method, and when the first and second materials are mutually compatible, molding takes place in a single mold by means of bi-injection of the two materials used, the sealing means being made before the ring is formed.

Whether the ring is made by the bi-injection technique as mentioned above or by a method having two separate molding steps, the invention takes advantage of the shrinkage, or expansion, or compression properties of the material constituting the ring 13 to ensure that said ring is fixed to the means 16 for couping the ring to the tube.

Figure 10:
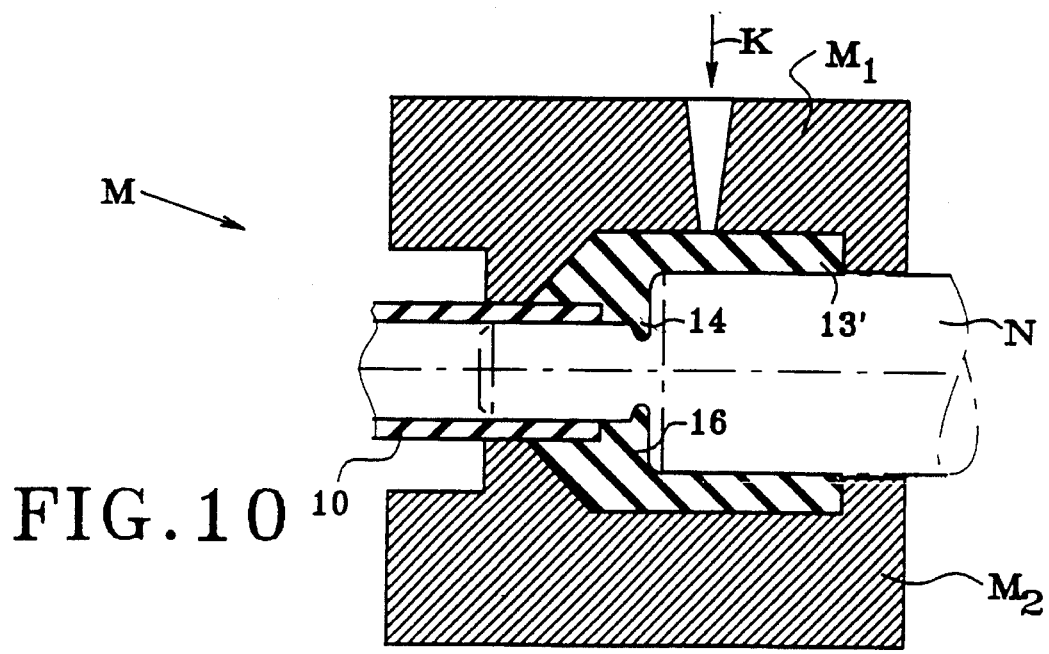
FIG. 10 relates to yet another implementation of the invention.

In the implementation shown in FIG. 10, the ring 13' (analogous to the ring 13 of the preceding implementations) is integral with the means 16 for coupling the tube 10 to an endpiece and with the lip 14 that forms the sealing means between the tube and said endpiece, the means 16, the lip 14, and the ring 13' being made by injecting a material of the elastomer type or having analogous properties into a mold M in which the tube 10 has been placed while fitted on the removable core N, injection taking place as shown by arrow K, and the material subsequently being vulcanized or crosslinked.

Figures 11, 12:
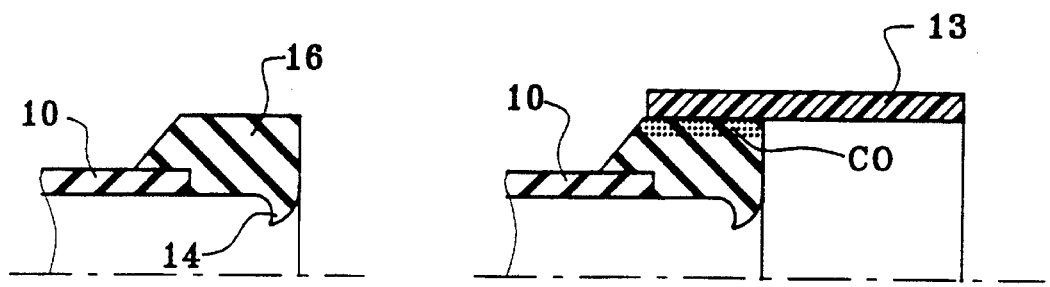
FIGS. 11 and 12 relate to another implementation.
Figure 13:
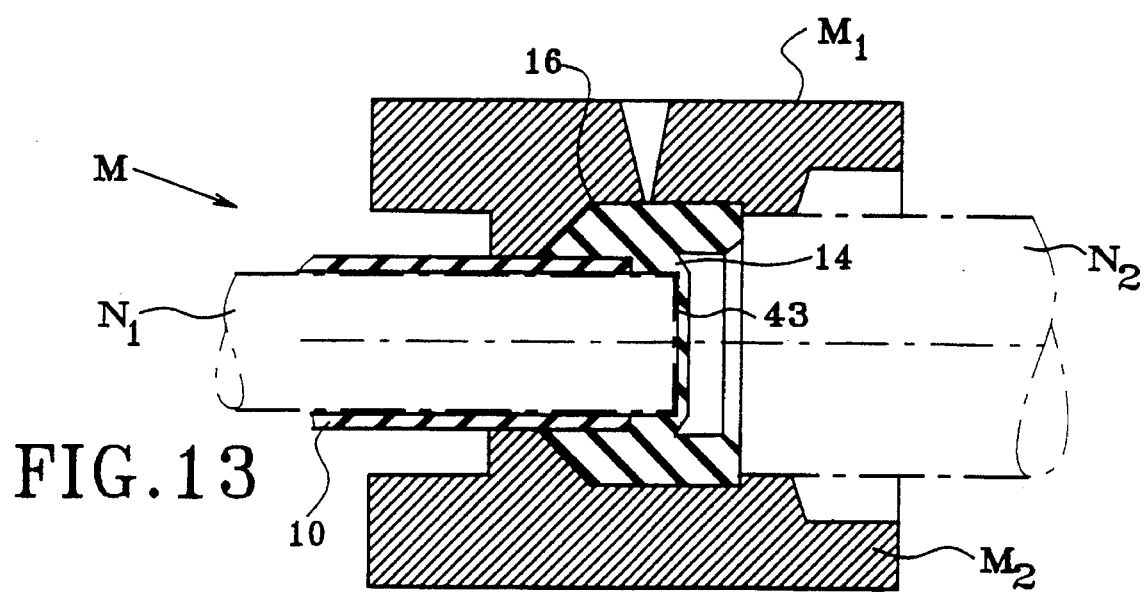
FIG. 13 shows a method of manufacturing a coupling as shown in FIG. 4.

In another implementation, as shown diagrammatically in FIGS. 11 and 12, the ring 13 is fixed by means of adhesive (as represented diagrammatically by dash marks co) to the outside surface of a portion 16 for coupling the tube 10 to the ring 13 and which also includes, integrally formed therewith, a sealing member such as a lip 14.

The invention is not limited to manufacturing couplings that comprise only one or more tubes and only one or more endpieces, but is advantageously also applicable to manufacturing a device as shown in FIG. 4. In such manufacture, the invention proposes using any of the implementations of the method as described above to form a membrane 43 that is integral with the means 16 that provide coupling between the tube 10 and the ring, and with the means such as a lip 14 that provide sealing of said tube and the endpiece with which it is to cooperate.

To simplify the use of language in the claims, the term "setting" is used to cover both vulcanizing and cross-linking, and the term "annular fitting" is used to cover both a ring and a sleeve.

I claim:

1. A waterproof coupling for joining a tube and an endpiece, the coupling comprising a sealing member molded on the tube, said sealing member being made of an elastomer type material and comprising means for sealing the tube and the endpiece, and an annular fitting for cooperating with an endpiece to assemble the tube to the endpiece, the annular fitting being secured to the tube by the sealing member.

2. A coupling according to claim 1, wherein the tube and the annular fitting are made of a material selected from metal, polymer plastics material, and elastomer.

3. A coupling according to claim 1, for two tubes and two endpieces, wherein said sealing member is molded on both tubes and at least one said annular fitting is secured on the tubes by said sealing member.

4. A coupling according to claim 3 and comprising two said annular fittings, each annular fitting being secured to one of the said tubes and comprising a first tubular end portion engaged into the tube and a second tubular end portion adapted for being engaged on an endpiece, said second tubular end portion being substantially in line with the tube and said sealing member being molded outside and inside said annular fittings and extending through openings formed in said annular fittings.

5. A coupling according to claim 1, wherein said sealing member comprises a perforatable membrane closing the tube until the tube has been assembled to the endpiece.

* * * * *